C. T. Grilley,
Capping Screws.
No. 2,284. Reissued June 12, 1866.
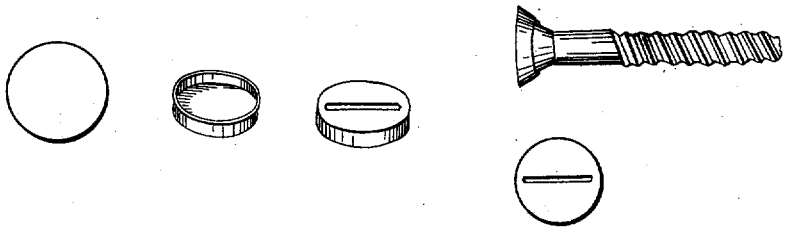
Witnesses:
Roger S. Baldwin
Milo Peck
Inventor:
Chas. T. Grilley
N. PETERS, PHOTO-LITHOGRAPHER, WASHINGTON, D. C.

UNITED STATES PATENT OFFICE.

CHARLES T. GRILLEY, OF NEW HAVEN, CONNECTICUT.

IMPROVEMENT IN CAPPING WOOD-SCREWS.

Specification forming part of Letters Patent No. 8,888, dated April 20, 1852; extended seven years; Reissue No. 2,284, dated June 12, 1866.

*To all whom it may concern:*

Be it known that I, CHARLES T. GRILLEY, of New Haven, in the county of New Haven and State of Connecticut, have invented certain new and useful Improvements in the Manufacture of Capped Screws, of which the following is a full and exact description or specification, taken in connection with the accompanying drawings.

The mode heretofore employed of capping screws consisted in applying to the head a cap made of extremely soft metal, so that by afterward striking it with a hammer or mallet the nick in the screw would show through the cap, and which would serve as a guide for the subsequent nicking of the cap. The disadvantages attendant upon this mode of capping were that it involved too much labor for the price they could be sold for, and that the covering metal was necessarily so soft as to afford but temporary protection to the head of the screw. Indeed, they would be indented by the screw-driver in the act of screwing the screw home.

The object, therefore, of this invention is, first, ability to use a more durable or harder metal for the cap; second, the dispensing with the tentative process of detecting the nick in the screw; and, third, the production, as a merchantable commodity, a screw of a better finish and at a less price than could be furnished by any other process.

I have accomplished the proposed object by forming the nick in the cap prior to its application onto the head of the screw. In this manner I am able to combine with and attach to the head of an iron screw a brass, copper, or plated cap, in such manner as to unite with the strength and comparative cheapness of an iron screw an external appearance and beauty, when inserted, similar and in all respects equal to that of screws made wholly of brass, copper, or plated metal.

To enable others skilled in the art to use my invention, I will proceed to describe the process of forming and placing the cap on the head of an iron screw.

I cut out of a sheet of brass, copper, or other suitable metal the blanks or disks by a stamp or die in the ordinary method, of a size sufficient to form the cap when closed over the head of the screw. The blank then passes into a drawing-die, by the operation of which it is formed into a plain shell, the edge of the disk being turned up all around a base of proper size for the top of the cap. This shell is then placed upon a pin of a size corresponding to that of the head of the screw to which it is to be attached, having a groove cut across the top to correspond with the groove in the head of the screw, and by means of a punch moving in a slide, or of a stamp so arranged as to strike upon and cut through the face of the cap immediately over the groove in the top of the pin, a nick is formed, which, when the cap is attached to the head of the screw, is adapted to be fitted to the groove or slot therein. The shell is then closed over the head of the screw in the ordinary way, as in the manufacture of buttons. It may be done either by a press, stamp, or on a lathe. The screw, with the cap thus attached to its head, is then placed in a die of a size and form corresponding to that of the under part of the head and cap and of the outer edge of the top of the cap, and rising a little above it. A punch of a size and form corresponding with that of the face of the head of the screw, having a projection adapted to the form of the nick in the cap and the slot in the head of the screw, is then applied with sufficient power or force to harden the plate, and at the same time to drive the sides of the nick or cut in its surface down into and to press them closely against the sides of the slot in the screw, whereby the cap becomes firmly attached and not liable to be thrown up from the face of the screw or turned or changed in its position by the operation of the screw-driver. The screw thus completed, when in place, presents the appearance of a brass, copper, or silver-plated screw. It greatly exceeds them in strength, and can be afforded at a greatly-reduced price.

I do not claim as my invention the adaptation simply of a cap of sheet metal to the particular configuration of any regular or irregular form by compression, or in whatever other manner the same may be produced; but What I do claim, and desire to obtain Letters Patent for as my invention, is—

The application to a nicked screw-head of a cap already nicked and folding the same upon and around said screw-head by compression, substantially as described.

In testimony whereof I have signed my name to this specification before two subscribing witnesses.

CHARLES T. GRILLEY.

Witnesses:
JAS. M. WOODWARD,
W. D. ANDERSON.